US011571963B2

(12) United States Patent
Moradnia et al.

(10) Patent No.: US 11,571,963 B2
(45) Date of Patent: Feb. 7, 2023

(54) AIR GUIDE ASSEMBLY (71) Applicant: Honda Motor Co., Ltd., Tokyo (JP)

(72) Inventors: Pirooz Moradnia, Dublin, OH (US);
Brian E. Dressel, Columbus, OH (US);
Derik Thomas Voigt, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 246 days.

(21) Appl. No.: 17/116,647

(22) Filed: Dec. 9, 2020

(65) Prior Publication Data
US 2022/0176806 A1   Jun. 9, 2022

(51) Int. Cl.
| B60K 11/00 | (2006.01) |
| B60K 11/06 | (2006.01) |
| B60K 11/08 | (2006.01) |
| B60R 13/08 | (2006.01) |

(52) U.S. Cl.
CPC ............ B60K 11/06 (2013.01); B60K 11/085 (2013.01); B60R 13/0846 (2013.01)

(58) Field of Classification Search
CPC ......... B60K 11/04; B60K 11/06; B60K 11/08; B60K 11/085; B60R 13/0846
See application file for complete search history.

(56) References Cited

U.S. PATENT DOCUMENTS

| 2,668,523 A | * | 2/1954 | Lamb | .................. F01P 5/06 165/122 |
| 4,213,426 A | * | 7/1980 | Longhouse | .................. F01P 5/06 165/122 |
| 4,522,160 A | * | 6/1985 | Speers | .................. F04D 29/646 415/213.1 |
| 4,541,369 A | * | 9/1985 | Ruhl | .................. F01P 5/06 416/190 |
| 4,774,911 A | * | 10/1988 | Yamaguchi | .................. F01P 5/06 415/213.1 |
| 5,740,766 A | * | 4/1998 | Moser | .................. F01P 5/06 415/173.6 |
| 6,302,066 B1 | * | 10/2001 | Steinmann | .................. B60K 11/02 123/41.49 |

(Continued)

FOREIGN PATENT DOCUMENTS

| DE | 102007024898 | 2/2008 |
| FR | 3010780 | 3/2015 |

(Continued)

*Primary Examiner* — Hau V Phan
(74) *Attorney, Agent, or Firm* — Rankin, Hill & Clark LLP (57) ABSTRACT An air guide assembly for a vehicle includes a first duct, a second duct, a rigid first housing, and a vehicle component. The first duct includes a flexible body, an inlet for receiving airflow from an exterior of a vehicle body, and an outlet, where the body of the first duct is compressible from an installed length to a length that is shorter than the installed length, and is expandable from the installed length to a length that is longer than the installed length. The second duct includes a flexible body, a first inlet for receiving airflow from the first duct, and an outlet, where the body of the second duct is compressible from an installed length to a length that is shorter than the installed length, and is expandable from the installed length to a length that is longer than the installed length.

20 Claims, 6 Drawing Sheets (56) References Cited

U.S. PATENT DOCUMENTS

| | | | | |
|---|---|---|---|---|
| 8,221,074 B2* | 7/2012 | Nelson | ............... | F04D 29/646 |
| | | | | 415/214.1 |
| 8,453,777 B2* | 6/2013 | Farlow | ............... | F04D 29/601 |
| | | | | 180/68.1 |
| 8,936,122 B2* | 1/2015 | MacGregor | ............ | B60K 11/04 |
| | | | | 180/68.1 |
| 9,676,422 B2 | 6/2017 | Schmidt et al. | | |
| 9,738,153 B2 | 8/2017 | Park et al. | | |
| 9,890,688 B2 | 2/2018 | Bui | | |
| 10,226,994 B2 | 3/2019 | Roussel et al. | | |
| 10,302,374 B2* | 5/2019 | Garrisi | ............... | B62D 25/085 |
| 10,479,193 B2 | 11/2019 | Shimizu | | |
| 2013/0248141 A1* | 9/2013 | Maurer | ............... | B60K 11/08 |
| | | | | 165/44 |

FOREIGN PATENT DOCUMENTS

| | | |
|---|---|---|
| FR | 3016598 | 7/2015 |
| JP | 4678498 | 4/2011 |
| JP | 5505252 | 5/2014 |

\* cited by examiner

FIG. 6

AIR GUIDE ASSEMBLY

BACKGROUND

In a vehicle an airflow is conventionally directed from outside the vehicle to a vehicle component inside the vehicle such as a heat exchanger for application with systems including radiators, intercoolers, air conditioning condensers, transmission coolers, battery packs, and electric motors to, for example, regulate the temperature of the component. Conventional systems apply rigid interconnecting elements between vehicle components along the airflow path. Such systems can be difficult to service. Further, such systems can vibrate and cause wear during operation of the vehicle.

BRIEF DESCRIPTION

According to one aspect, an air guide assembly for a vehicle includes a first duct, a second duct, a rigid first housing, and a vehicle component. The first duct includes a flexible body, an inlet for receiving airflow from an exterior of a vehicle body, and an outlet, where the body of the first duct is compressible from an installed length to a length that is shorter than the installed length, and the body of the first duct is expandable from the installed length to a length that is longer than the installed length. The second duct includes a flexible body, a first inlet for receiving airflow from the first duct, and an outlet, where the body of the second duct is compressible from an installed length to a length that is shorter than the installed length, and the body of the second duct is expandable from the installed length to a length that is longer than the installed length. The first housing is secured to the vehicle body, the first housing including an inlet removably secured to the outlet of the first duct and an outlet removably secured to the first inlet of the second duct. The vehicle component is in fluid communication with the outlet of the first housing.

According to another aspect, an air guide assembly for a vehicle includes a rigid first conduit, a first duct, a second duct, a rigid first housing, a rigid second housing, and a vehicle component. The first conduit is secured to a vehicle body, the first conduit including an inlet directly connected to the vehicle body for receiving airflow from the exterior of the vehicle body, and an outlet. The first duct includes a flexible body, an inlet for receiving airflow from an exterior of a vehicle body, and an outlet, where the body of the first duct is compressible from an installed length to a length that is shorter than the installed length, and the body of the first duct is expandable from the installed length to a length longer than the installed length, the first duct having wall is formed from a series of panels flexibly interlinked with each other and configured to elastically deform and absorb motion between the inlet of the first duct and the outlet the first duct. The inlet of the first duct is connected to the outlet of the first conduit to receive airflow from the exterior of the vehicle body. The second duct includes a flexible body, a first inlet for receiving airflow from the first duct, and an outlet, where the body of the second duct is compressible from an installed length to a length that is shorter than the installed length, and the body of the second duct is expandable from the installed length to a length longer than the installed length. The first housing is secured to the vehicle body, the first housing including an inlet removably secured to the outlet of the first duct and an outlet removably secured to the first inlet of the second duct. The second housing is secured to the vehicle body, the second housing including an inlet removably secured to the outlet of the second duct. The vehicle component is in fluid communication with the outlet of the second housing.

DETAILED DESCRIPTION

Figure 1:
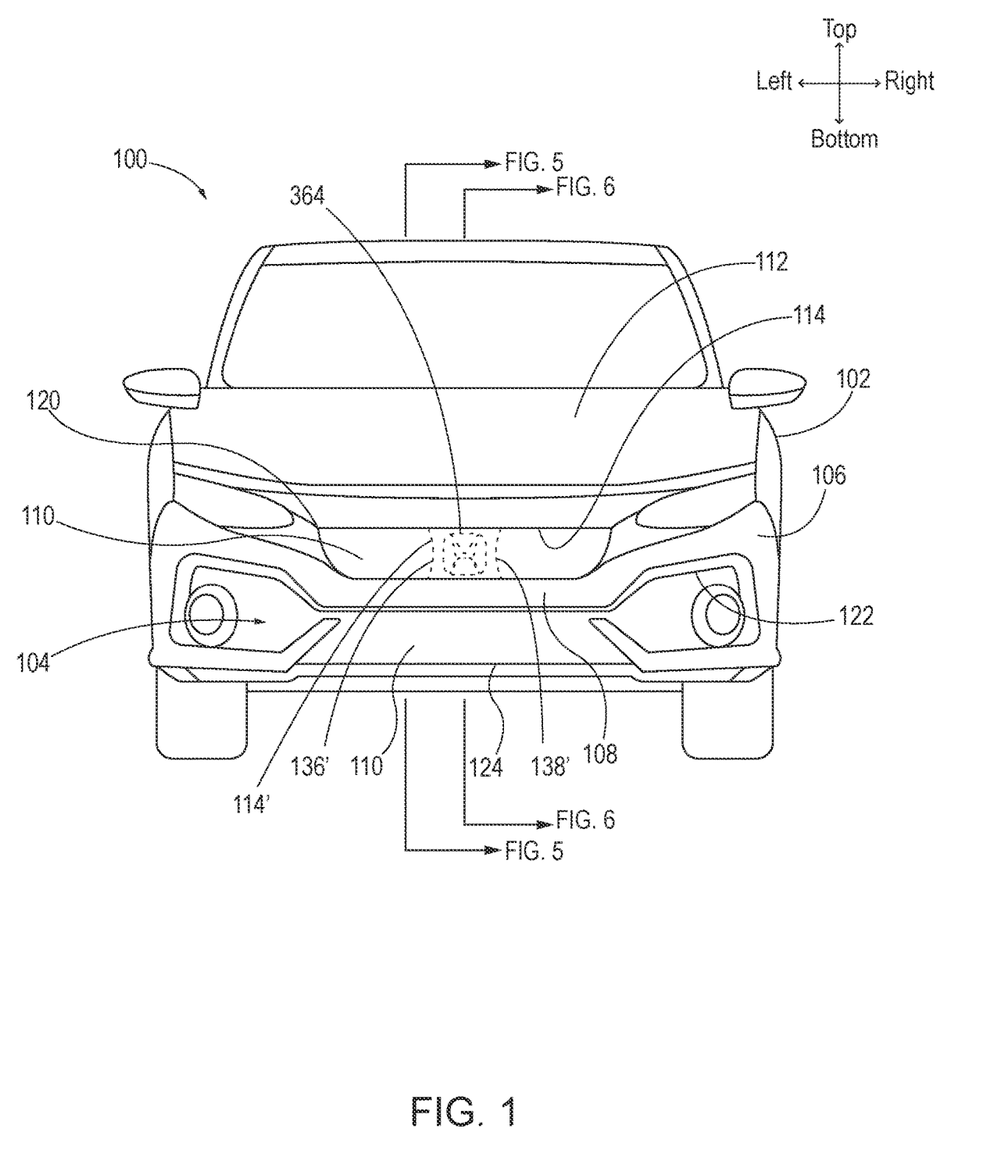
FIG. 1 is a front view of a vehicle.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a vehicle 100 including a vehicle body 102 with an inlet area 104 located at a front end 106 of the vehicle 100. The inlet area 104 has an upstream end 108 configured to direct a headwind of the vehicle 100 toward an interior 110 of the vehicle body 102 from an exterior 112 of the vehicle body 102. The inlet area 104 is at least partially defined by an upper air guide 114 having an inlet 120 and a lower air guide 122 having an inlet 124 spaced from the inlet 120 of the upper air guide 114 in a top-bottom direction of the vehicle 100 such that airflow into the interior 110 of the vehicle 100 through the inlet area 104 is directed in parallel flow through the inlet 120 of the upper air guide 114 and the inlet 120 of the lower air guide 122.

Figure 2:
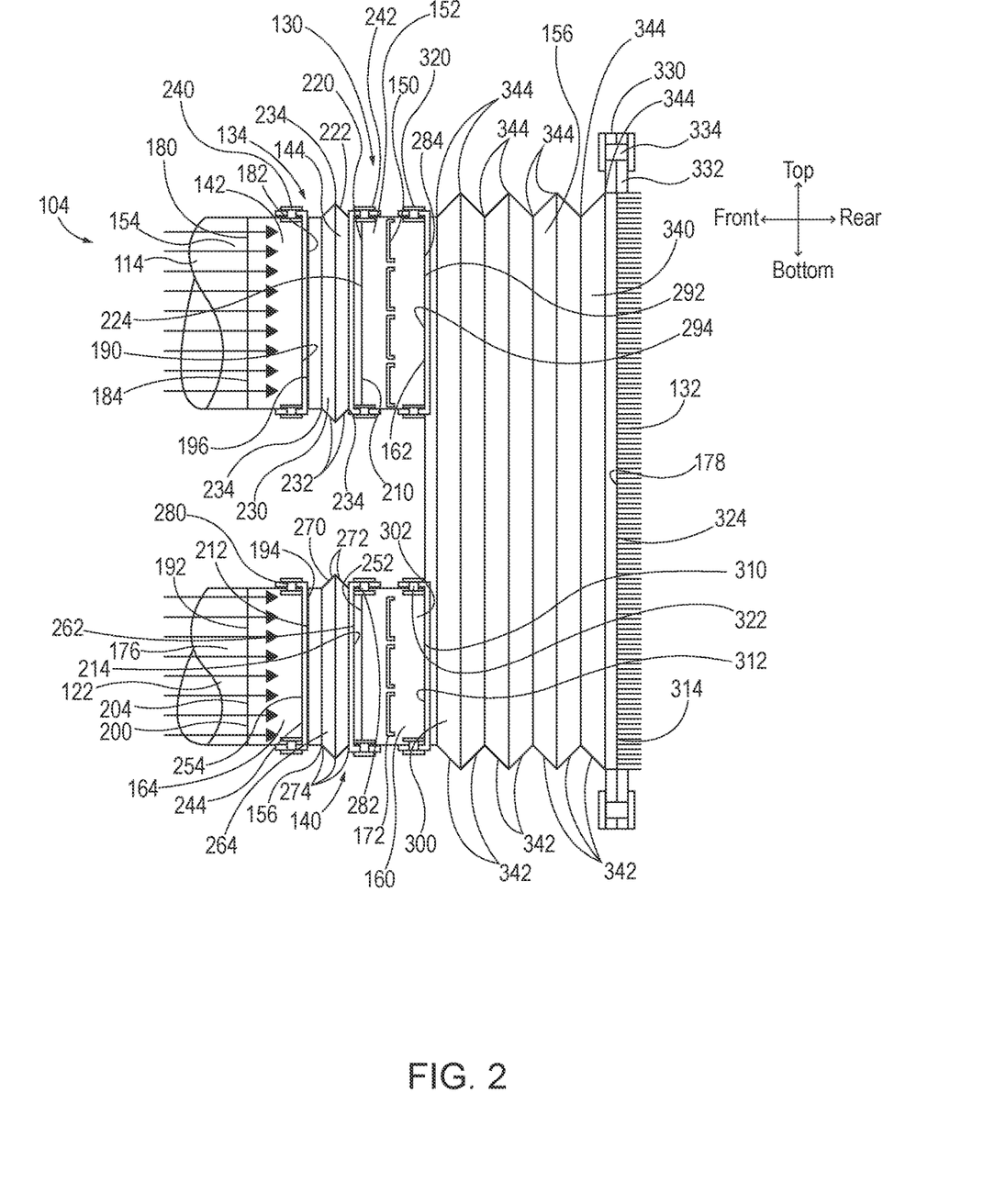
FIG. 2 is a partial cross-sectional side view of the vehicle including an air guide assembly according to the present disclosure.
Figure 3:
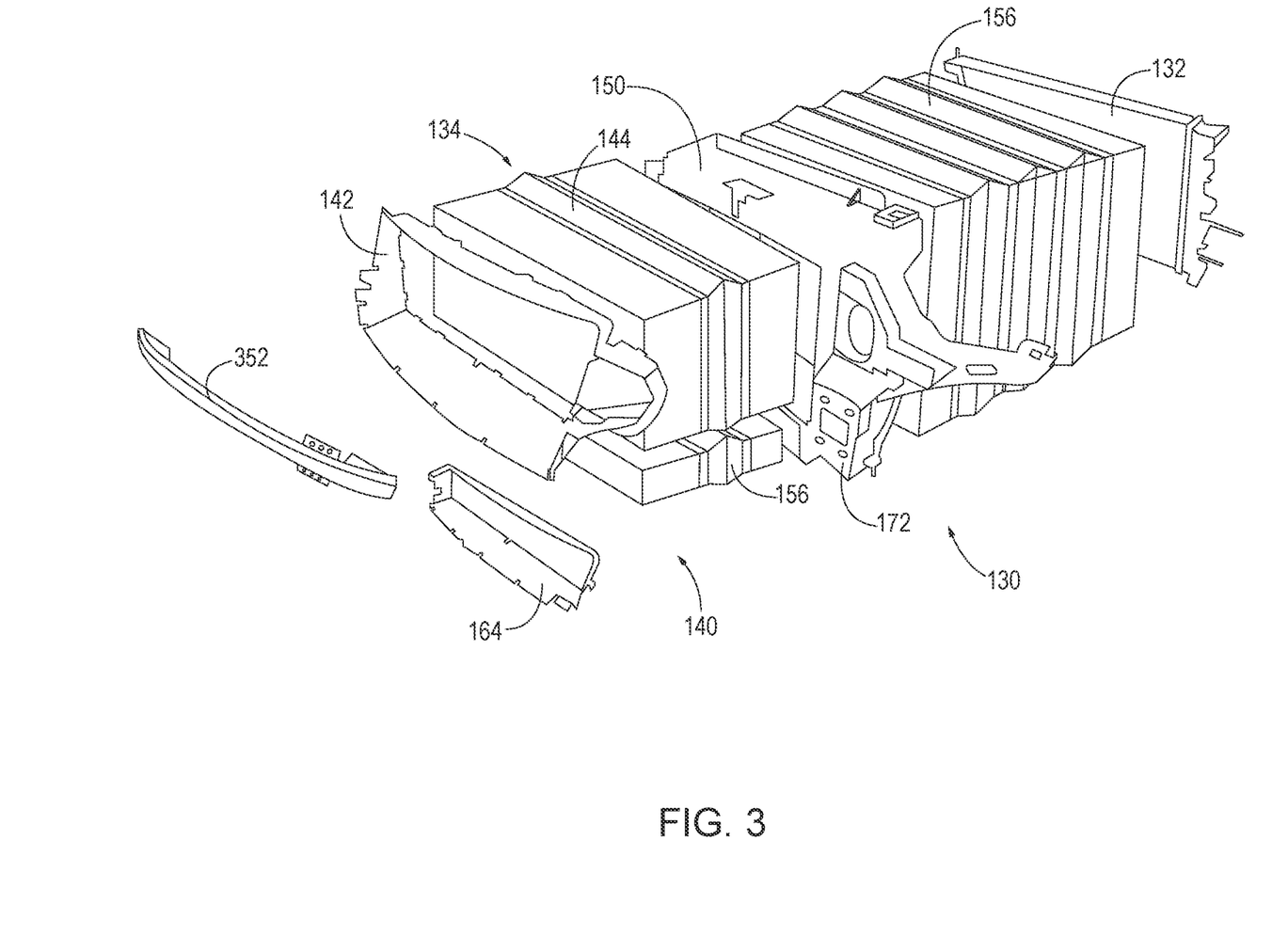
FIG. 3 is an exploded view of the air guide assembly.

As depicted in FIG. 2, the inlet area 104 is configured to direct a headwind of the vehicle 100 through an air guide assembly 130 to a vehicle component 132 such as a flow through heat exchanger. As shown in FIGS. 2 and 3, the air guide assembly 130 includes a first passage 134 and a second passage 140 configured to direct atmospheric air from the inlet area 104 of the vehicle 100 to the vehicle component 132. The first passage 134 includes a first conduit 142 secured to the vehicle body 102, a first duct 144, and a first shutter 150 positioned in a first housing 152 secured to the vehicle body 102, where the first conduit 142, the first duct 144, and the first housing 152 are in fluid communication with each other and between an outlet 154 of the upper air guide 114 and a second duct 156 in fluid communication with the vehicle component 132. The first conduit 142 and the first housing 152 are rigid as compared to the first duct 144, and with the first shutter 150 positioned in the first housing 152, the first shutter 150 is operable to control airflow to the vehicle component 132 from the first housing 152. The vehicle component 132 is positioned in a second housing 160 secured to the vehicle body 102, and in fluid communication with the second duct 156 such that the vehicle component 132 is in fluid communication with an outlet 162 of the first housing 152.

The second passage 140 has a construction similar to the first passage 134 and is spaced from the first passage 134 in the top-bottom direction of the vehicle 100. The second passage 140 includes a second conduit 164 secured to the vehicle body 102, a third duct 170, and a second shutter 172 positioned in a third housing 174 secured to the vehicle body 102, where the second conduit 164, the third duct 170, and the third housing 174 are in fluid communication with each other and between an outlet 176 of the lower air guide 122 and the second duct 156. The first conduit 142 is located at the front end 106 of the vehicle 100 to direct the headwind of the vehicle 100 inside the vehicle body 102, and the second conduit 164 is located at the front end 106 of the vehicle 100 below the first conduit 142 in an up-down direction of the vehicle 100 to direct the headwind inside the vehicle body 102.

The first conduit 142, the first housing 152, the second housing 160, the second conduit 164, and the third housing 174 are rigid as compared to the first duct 144, the second duct 156, and the third duct 170, and with the second shutter 172 positioned in the third housing 174, the second shutter 172 is operable to control airflow from the vehicle component 132 from the third housing 174. When the front end 106 of the vehicle 100 deforms such that the first housing 152 and the third housing 174 are positioned nearer to the second housing 160 as compared to when the second duct 156 is installed therebetween, the second duct 156 is compressed between the first housing 152, the second housing 160, and the third housing 174 to a length that is shorter than the installed length, and the second duct 156 is configured to expand between the first housing 152, the second housing 160, and the third housing 174 back to, and beyond the installed length without experiencing structural failure or fatigue. When the front end 106 of the vehicle 100 deforms such that the first housing 152 and the third housing 174 are positioned farther from the second housing 160 as compared to when the second duct 156 is installed therebetween, the second duct 156 is expanded between the first housing 152, the second housing 160, and the third housing 174 to a length that is longer than the installed length, and the second duct 156 is configured to compress back to, and beyond the installed length without experiencing structural failure or fatigue.

The second duct 156 is configured to receive airflow from the first passage 134 and the second passage 140, and direct airflow to the vehicle component 132 in the second housing 160. The second housing 160 includes an inlet 178 removably secured to the outlet 324 of the second duct 156. With the vehicle component 132 positioned in the second housing 160, the first passage 134 and the second passage 140 are respectively configured to direct atmospheric air from the upper air guide 114 and the lower air guide 122 to the vehicle component 132 in the second housing 160 through the second duct 156.

With continued reference to FIG. 2, the first conduit 142 extends from the upper air guide 114 at the inlet area 104 to the first duct 144 in a front-rear direction of the vehicle 100. The first conduit 142 is in fluid communication with the inlet area 104 through the upper air guide 114 such that the first conduit 142 has an upstream end 180 and a downstream end 182 with respect to airflow through the first passage 134 from the outlet 154 of the upper air guide 114 toward the vehicle component 132 in the second housing 160. The upstream end 180 of the first conduit 142 defines an inlet 184 that is fixed with the outlet 154 of the upper air guide 114 to direct airflow from the inlet area 104 into the upstream end 180 of the first conduit 142, and through an outlet 190 of the first conduit 142 defined by the downstream end 182 of the first conduit 142. In an embodiment, the inlet 184 of the first conduit 142 is fixed directly with the outlet 154 of the upper air guide 114 and forms an airtight seal with the outlet 154 of the upper air guide 114 such that substantially all airflow directed through the outlet 154 of the upper air guide 114 is further directed into the first passage 134 through the inlet 184 of the first conduit 142. In this manner, the inlet 184 of the first conduit 142 is directly connected to the vehicle body 102 for receiving airflow from the exterior 112 of the vehicle body 102.

The second conduit 164 has a construction similar to the first conduit 142, extends from the inlet area 104 to the third duct 170 in the front-rear direction of the vehicle 100, and is spaced from the first conduit 142 in the top-bottom direction of the vehicle 100. The second conduit 164 is in fluid communication with the inlet area 104 through the inlet 124 of the lower air guide 122 such that the second conduit 164 has an upstream end 192 and a downstream end 194 with respect to airflow through the second passage 140 from the outlet 176 of the lower air guide 122 toward the vehicle component 132 in the second housing 160. The upstream end 192 of the second conduit 164 defines an inlet 200 that is fixed with an outlet 176 of the lower air guide 122 at a location of the inlet area 104 spaced from the first conduit 142 in the top-bottom direction of the vehicle 100. In this manner, the second conduit 164 is configured to direct airflow from the inlet area 104 into the upstream end 192 of the second conduit 164, and through an outlet 204 of the second conduit 164 defined by the downstream end 182 of the second conduit 164.

In an embodiment, the inlet 200 of the second conduit 164 is directly connected to the outlet 176 of the lower air guide 122 and forms an airtight seal with the outlet 176 of the lower air guide 122 such that substantially all airflow directed through the outlet 176 of the lower air guide 122 is further directed into the second passage 140 through the inlet 200 of the second conduit 164. In this manner, the inlet 200 of the second conduit 164 is directly connected to the vehicle body 102 for receiving airflow from the exterior 112 of the vehicle body 102.

The first duct 144 is in fluid communication with the inlet area 104 on the first passage 134 through the first conduit 142 such that the first duct 144 has an upstream end 196 and a downstream end 210 with respect to airflow through the first passage 134 from the outlet 190 of the first conduit 142 toward the vehicle component 132 in the second housing 160. The upstream end 196 of the first duct 144 defines an inlet 212 that is fixed and in fluid communication with the downstream end 182 of the first conduit 142, and the downstream end 210 of the first duct 144 defines an outlet 214 that is fixed and in fluid communication with an upstream end 220 of the first housing 152. In this manner, the inlet 212 of the first duct 144 is configured for receiving airflow from the exterior 112 of the vehicle body 102.

It should be appreciated that the term "flexible," as used herein, refers to a property of elastic deformability, where an element is capable of returning to an original shape after being compressed, expanded, or otherwise deformed from the original shape, without experiencing structural failure or fatigue. The first duct 144 has a body 222 that is flexible as compared to the first conduit 142 and the first housing 152, which are relatively rigid, and in this manner the first duct 144 is configured to elastically deform and absorb motion between the first conduit 142 and the first housing 152. When the front end 106 of the vehicle 100 deforms such that the first conduit 142 and the first housing 152 are positioned nearer to each other as compared to when the first duct 144 is installed therebetween, the first duct 144 is compressed between the first conduit 142 and the first housing 152 to a length that is shorter than the installed length, and the first duct 144 is configured to expand between the first conduit 142 and the first housing 152 back to, and beyond the installed length without experiencing structural failure or fatigue. When the front end 106 of the vehicle 100 deforms such that the first conduit 142 and the first housing 152 are positioned farther from each other as compared to when the first duct 144 is installed therebetween, the first duct 144 is expanded between the first conduit 142 and the first housing 152 to a length that is longer than the installed length, and the first duct 144 is configured to compress back to, and beyond the installed length without experiencing structural failure or fatigue.

To this end, the body 222 of the first duct 144 between the first conduit 142 and the first housing 152 in the front-rear direction of the vehicle 100 features an accordion-styled construction where the first duct 144 has walls 230 formed from a series of panels 232 flexibly interlinked with each other, the panels 232 of the first duct 144 being flat sections of the walls 230 of the first duct 144 separated by bent sections 234 of the first duct 144. The bent sections 234 of the first duct 144 are elastically bent sections such that the walls 230 of the first duct 144 are configured to absorb motion between the first conduit 142 and the first housing 152 with the accordion-styled construction by elastically deforming at the bent sections 234 between the panels 232. In this manner, the body 222 of the first duct 144 is compressible from an installed length between the first conduit 142 and the first housing 152 in the front-rear vehicle direction to a length that is shorter than the installed length, and the body 222 of the first duct 144 is expandable from the installed length to a length longer than the installed length. In an embodiment, the first duct 144 is formed from a continuous sleeve made of rubber or a similarly flexible material, where the panels 232 and the bent sections 234 forming the walls 230 of the first duct 144 are integrally formed with each other.

The outlet 190 of the first conduit 142 forms an airtight seal with the inlet 212 of first duct 144 such that substantially all airflow directed through the outlet 190 of the first conduit 142 is further directed into the inlet 212 of the first duct 144. The first duct 144 is airtight along the first passage 134 from the first conduit 142 to the first housing 152 such that substantially all airflow directed into the upstream end 196 of the first duct 144 is further directed through the downstream end 210 of the first duct 144. The downstream end 210 of the first duct 144 forms an airtight seal with the upstream end 180 of the first housing 152 such that substantially all airflow directed through the downstream end 210 of the first duct 144 is further directed into the upstream end 180 of the first housing 152. As such, the first passage 134 is entirely airtight through the first duct 144 from the outlet 190 of the first conduit 142 to an inlet 224 defined in the upstream end 220 of the first housing 152. The inlet 224 of the first housing 152 is removably secured to the outlet 214 of the first duct 144.

The airtight seal between the first conduit 142 and the first duct 144 is formed where the upstream end 196 of the first duct 144 overlaps the downstream end 182 of the first conduit 142 along the first passage 134, around an outer perimeter of the first conduit 142. A portion of the first duct 144 overlapped with the first conduit 142 is fixed directly to the first conduit 142 with a first fastener 240 such as a push pin inserted through the first duct 144 and the first conduit 142. In this manner, the inlet 212 of the first duct 144 is directly connected to the outlet 214 of the first conduit 142 to receive airflow from the exterior 112 of the vehicle body 102. Notably, while the first fastener 240 is depicted as a single push pin, the first fastener 240 can include a plurality of fasteners respectively disposed through the first duct 144 and the first conduit 142, and can employ functionally similar fastener designs alternative to push pins without departing from the scope of the present disclosure. In an alternative embodiment, the first duct 144 is formed with a plurality of interlocking shapes complementary with features of the first conduit 142 for fixing the first duct 144 with the first conduit 142.

The airtight seal between the first duct 144 and the first housing 152 is formed where the downstream end 210 of the first duct 144 overlaps the upstream end 180 of the first housing 152 along the first passage 134, around an outer perimeter of the first housing 152. A portion of the first duct 144 overlapped with the first housing 152 is fixed directly to the first housing 152 with a second fastener 242 such as a push pin inserted through the first duct 144 and the first housing 152. Notably, while the second fastener 242 is depicted as a single push pin, the second fastener 242 can include a plurality of fasteners respectively disposed through the first duct 144 and the first housing 152, and can employ functionally similar fastener designs alternative to push pins without departing from the scope of the present disclosure. In an alternative embodiment, the first duct 144 is formed with a plurality of interlocking shapes complementary with features of the first housing 152 for fixing the first duct 144 with the first housing 152.

With continued reference to FIG. 2, the third duct 170 features a construction similar to the first duct 144, where the third duct 170 is in fluid communication with the inlet area 104 on the second passage 140 through the second conduit 164 such that the third duct 170 has an upstream end 244 and a downstream end 250 with respect to airflow through the second passage 140 from the second conduit 164 toward the vehicle component 132 in the second housing 160. The upstream end 244 of the third duct 170 defines an inlet 254 that is fixed and in fluid communication with the outlet 204 of the second conduit 164 such that the inlet 254 is configured for receiving airflow from the exterior 112 of the vehicle body 102. The downstream end 250 of the third duct 170 defines an outlet 260 that is fixed and in fluid communication with an inlet 262 defined in an upstream end 252 of the third housing 174.

The third duct 170 has a body 264 that is flexible as compared to the second conduit 164 and the third housing 174, which are relatively rigid, and in this manner the third duct 170 is configured to elastically deform and absorb motion between the second conduit 164 and the third housing 174. When the front end 106 of the vehicle 100 deforms such that the second conduit 164 and the third housing 174 are positioned nearer to each other as compared to when the third duct 170 is installed therebetween, the third duct 170 is compressed between the second conduit 164 and the third housing 174 to a length that is shorter than the installed length, and the third duct 170 is configured to expand between the second conduit 164 and the third housing 174 back to, and beyond the installed length without experiencing structural failure or fatigue. When the front end 106 of the vehicle 100 deforms such that the second conduit 164 and the third housing 174 are positioned farther from each other as compared to when the third duct 170 is installed therebetween, the third duct 170 is expanded between the first conduit 164 and the first housing 174 to a length that is longer than the installed length, and the third duct 170 is configured to compress back to, and beyond the installed length without experiencing structural failure or fatigue.

To this end, the body 264 of the third duct 170 between the second conduit 164 and the third housing 174 features an accordion-styled construction where the third duct 170 has walls 270 formed from a series of panels 272 flexibly interlinked with each other, the panels 272 of the third duct 170 being flat sections of the walls 270 of the third duct 170 separated by bent sections 274 of the third duct 170. The bent sections 274 of the third duct 170 are elastically bent sections such that the walls 270 of the third duct 170 are configured to absorb motion between the second conduit 164 and the third housing 174 with the accordion-styled construction by elastically deforming at the bent sections 274 between the panels 272. In this manner, the body 264 of the third duct 170 is compressible from an installed length between the second conduit 164 and the third housing 174 in the front-rear direction of the vehicle 100 to a length that is shorter than the installed length, and the body 264 of the third duct 170 is expandable from the installed length to a length longer than the installed length. In an embodiment, the third duct 170 is formed from a continuous sleeve made of rubber or a similarly flexible material, where the panels 272 and the bent sections 274 forming the walls 270 of the third duct 170 are integrally formed with each other.

The outlet 204 of the second conduit 164 forms an airtight seal with the inlet 254 of the third duct 170 such that substantially all airflow directed through the outlet 204 of the second conduit 164 is further directed into the inlet 254 of the third duct 170. The third duct 170 is airtight along the second passage 140 from the second conduit 164 to the third housing 174 such that substantially all airflow directed into the inlet 254 of the third duct 170 is further directed through the outlet 260 of the third duct 170. The outlet 260 of the third duct 170 forms an airtight seal with the inlet 262 of the third housing 174 such that substantially all airflow directed through the outlet 260 of the third duct 170 is further directed into the inlet 262 of the third housing 174. As such, the second passage 140 is entirely airtight through the third duct 170 from the outlet 204 of the second conduit 164 to the inlet 262 of the third housing 174.

The airtight seal between the second conduit 164 and the third duct 170 is formed where the inlet 254 of the third duct 170 overlaps the outlet 204 of the second conduit 164 along the second passage 140, around an outer perimeter of the second conduit 164. A portion of the third duct 170 overlapped with the second conduit 164 is fixed directly to the second conduit 164 with a third fastener 280 such as a push pin inserted through the second duct 156 and the second conduit 164. In this manner, the inlet 254 of the third duct 170 is directly connected to the outlet 204 of the second conduit 164 to receive airflow from the exterior 112 of the vehicle body 102. Notably, while the third fastener 280 is depicted as a single push pin, the third fastener 280 can include a plurality of fasteners respectively disposed through the third duct 170 and the second conduit 164, and can employ functionally similar fastener designs alternative to push pins without departing from the scope of the present disclosure. In an alternative embodiment, the third duct 170 is formed with a plurality of interlocking shapes complementary with features of the second conduit 164 for fixing the third duct 170 with the second conduit 164.

The airtight seal between the third duct 170 and the third housing 174 along the second passage 140 is formed where the downstream end 250 of the third duct 170 overlaps the upstream end 252 of the third housing 174 around an outer perimeter of the third housing 174. A portion of the third duct 170 overlapped with the third housing 174 is fixed directly to the third housing 174 with a fourth fastener 282 such as a push pin inserted through the third duct 170 and the third housing 174. Notably, while the fourth fastener 282 is depicted as a single push pin, the fourth fastener 282 can include a plurality of fasteners respectively disposed through the third duct 170 and the third housing 174, and can employ functionally similar fastener designs alternative to push pins without departing from the scope of the present disclosure. In an alternative embodiment, the third duct 170 is formed with a plurality of interlocking shapes complementary with features of the third housing 174 for fixing the third duct 170 with the first conduit 142.

The first housing 152 is in fluid communication with the first duct 144 along the first passage 134 to define the upstream end 180 and a downstream end 284 with respect to airflow through the first passage 134 from the first duct 144 toward the vehicle component 132 in the second housing 160. The inlet 224 of the first housing 152 is fixed and in fluid communication with the outlet 214 of the first duct 144, and the downstream end 284 of the first housing 152 defines an outlet 292 that is fixed and in fluid communication with a first inlet 294 defined in an upstream end 300 of the second duct 156. The outlet 292 of the first housing 152 is removably secured to the first inlet 294 of the second duct 156. In this manner, the first inlet 294 of the second duct 156 is configured for receiving airflow from the first duct 144.

The second shutter 172 and the third housing 174 have a construction respectively similar to the first shutter 150 and the first housing 152, where the third housing 174 is in fluid communication with the third duct 170 along the second passage 140 to define the upstream end 252 and a downstream end 302 with respect to airflow through the second passage 140 from the third duct 170 toward the vehicle component 132 in the second housing 160. The inlet 262 of the third housing 174 is fixed and in fluid communication with the outlet 260 of the third duct 170, and the downstream end 302 of the third housing 174 defines an outlet 310 that is fixed and in fluid communication with a second inlet 312 defined in the upstream end 300 of the second duct 156. The inlet 262 of the third housing 174 is removably secured to the outlet 260 of the third duct 170, and the outlet 310 of the third housing 174 is removably secured to the second inlet 312 of the second duct 156. In this manner, the second inlet 312 of the second duct 156 is configured for receiving airflow from the third duct 170. With the first duct 144, the second duct 156, and the third duct 170 each being flexible and removably secured to the air guide assembly 130, the first duct 144, the second duct 156, and the third duct 170 are respectively configured for being removed from the vehicle 100 for servicing portions of the front end 106 of the vehicle 100 and components therein which may otherwise be obstructed from access by a user, such components including the first housing 152, the first shutter 150, the second housing 160, the second shutter 172, and the third housing 174.

The second duct 156 brings the first passage 134 and the second passage 140 in fluid communication with the vehicle component 132 such that the second duct 156 includes the upstream end 300 and a downstream end 314 with respect to airflow through the second duct 156 from the first passage 134 and the second passage 140 to the vehicle component 132. The upstream end 300 of the second duct 156 defines the first inlet 294, which is fixed and in fluid communication with the outlet 162 of the first housing 152. The upstream end 300 of the second duct 156 also defines the second inlet 312, which is fixed and in fluid communication with the outlet 310 of the third housing 174 at a location of the second duct 156 spaced from the first housing 152 in the top-bottom direction of the vehicle 100. The downstream end 314 of the second duct 156 is fixed and in fluid communication with the vehicle component 132 in the second housing 160.

The first inlet 294 of the second duct 156 forms an airtight seal with the outlet 162 of the first housing 152 such that substantially all airflow directed through the outlet 162 of the first housing 152 is further directed into the first inlet 294 of the second duct 156. With this, the first passage 134 is airtight from the outlet 190 of the first conduit 142 to the first inlet 294 of the second duct 156. The second inlet 312 of the second duct 156 also forms an airtight seal with the outlet 310 of the third housing 174 such that substantially all airflow directed through the outlet 310 of the third housing 174 is further directed into the second inlet 312 of the second duct 156. As such, the second passage 140 is airtight from the downstream end 194 of the second conduit 164 to the upstream end 300 of the second duct 156.

The airtight seal between the first housing 152 and the second duct 156 is formed where the first inlet 294 of the second duct 156 overlaps the outlet 162 of the first housing 152, around an outer perimeter of the first housing 152. A portion of the second duct 156 overlapped with the first housing 152 is fixed directly to the first conduit 142 with a fifth fastener 320 such as a push pin inserted through the first housing 152 and the second duct 156. Notably, while the fifth fastener 320 is depicted as a single push pin, the fifth fastener 320 can include a plurality of fasteners respectively disposed through the second duct 156 and the first housing 152, and can employ functionally similar fastener designs alternative to push pins without departing from the scope of the present disclosure. In an alternative embodiment, the second duct 156 is formed with a plurality of interlocking shapes complementary with features of the first housing 152 for fixing the second duct 156 with the first housing 152.

The airtight seal between the third housing 174 and the second duct 156 is formed where the second inlet 312 of the second duct 156 overlaps the outlet 310 of the third housing 174, around an outer perimeter of the third housing 174. A portion of the second duct 156 overlapped with the third housing 174 is fixed directly to the first conduit 142 with a sixth fastener 322 such as a push pin inserted through the third housing 174 and the second duct 156. Notably, while the sixth fastener 322 is depicted as a single push pin, the sixth fastener 322 can include a plurality of fasteners respectively disposed through the third housing 174 and the second duct 156, and can employ functionally similar fastener designs alternative to push pins without departing from the scope of the present disclosure. In an alternative embodiment, the second duct 156 is formed with a plurality of interlocking shapes complementary with features of the third housing 174 for fixing the second duct 156 with the third housing 174.

The second duct 156 is airtight from the first housing 152 and the third housing 174 to the vehicle component 132 such that substantially all airflow directed into the upstream end 300 of the second duct 156 is further directed through an outlet 324 of the second duct 156 to the vehicle component 132 in the second housing 160. The outlet 324 of the second duct 156 forms an airtight seal with the second housing 160 such that substantially all airflow directed through the outlet 324 of the second duct 156 is further directed to the vehicle component 132. With the first passage 134 being airtight between the first conduit 142 and the second duct 156, the second passage 140 being airtight between the second conduit 164 and the second duct 156, and the second duct 156 being airtight from the first passage 134 and the second passage 140 to the vehicle component 132, substantially all airflow directed into the first passage 134 and the second passage 140 from the inlet area 104 is further directed to the vehicle component 132.

A second duct flange 330 is extended outward from the second duct 156 and disposed at the downstream end 314 of second duct 156. A vehicle component flange 332 corresponding with the second duct flange 330 is extended outward from the vehicle component 132, where the downstream end 314 of the second duct 156 is engaged with the vehicle component 132 such that the second duct flange 330 is aligned with the vehicle component flange 332. A seventh fastener 334 such as a push pin is extended through the second duct flange 330 and the vehicle component flange 332 to fix the downstream end 314 of the second duct 156 with the vehicle component 132.

The second duct 156 is flexible as compared to the vehicle component 132 and the first housing 152 to elastically deform and absorb motion between the first housing 152 and the vehicle component 132. To this end, a length of the second duct 156 between the first passage 134, the second passage 140, and the vehicle component 132 features an accordion-styled construction where the second duct 156 has walls 340 formed from a series of panels 342 flexibly interlinked with each other. The panels 342 of the second duct 156 are flat sections of the walls 340 of the second duct 156 separated by bent sections 344 of the second duct 156. The bent sections 344 of the second duct 156 are elastically bent sections such that the walls 340 of the second duct 156 are configured to absorb motion between the first passage 134, the second passage 140, and the vehicle component 132 with the accordion-styled construction by elastically deforming at the bent sections 344 between the panels 342.

Figure 4:
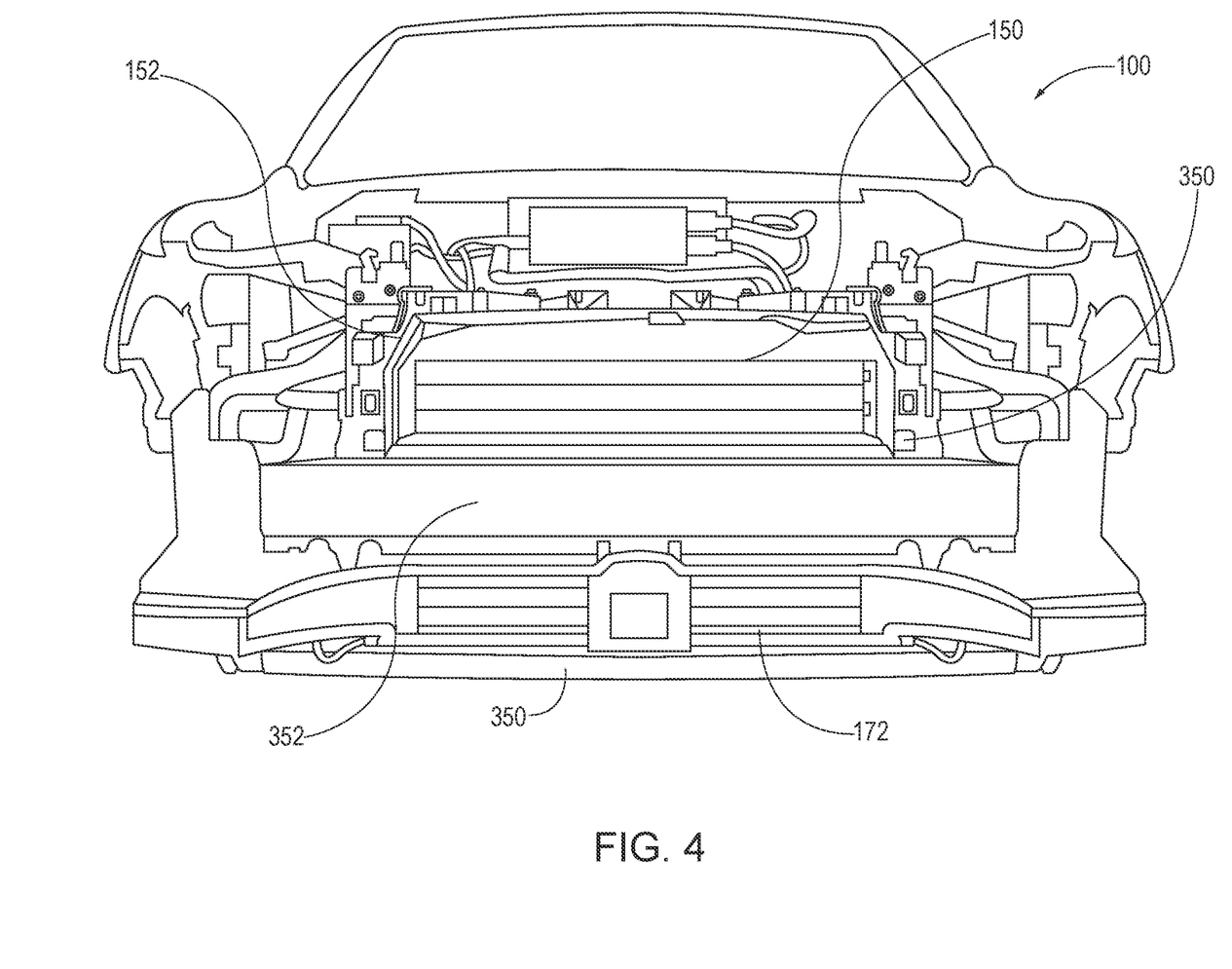
FIG. 4 is a front view of the vehicle partially disassembled.

The first housing 152 and the third housing 174 are supported on a frame 350 of the vehicle 100 between the inlet area 104 and the vehicle component 132 taken along the front-rear direction of the vehicle 100. As depicted in FIG. 4, the first housing 152 is mounted to the vehicle 100 above a bumper beam 352 in the top-bottom direction of the vehicle 100, and the third housing 174 is mounted to the vehicle 100 below the bumper beam 352 in the top-bottom direction of the vehicle 100. The walls 340 of the second duct 156 are configured to elastically deform and absorb motion between the frame 350 of the vehicle 100 through the first housing 152 and the third housing 174, and the vehicle component 132.

With the first housing 152 mounted on the frame 350 of the vehicle 100, the walls 230 of the first duct 144 are configured to elastically deform and absorb motion between the inlet area 104 of the vehicle 100 through first conduit 142 and the frame 350 of the vehicle 100 through the first housing 152. Similarly, with the third housing 174 mounted on the frame 350 of the vehicle 100, the walls 270 of the third duct 170 are configured to elastically deform and absorb motion between the inlet area 104 of the vehicle 100 through the second conduit 164 and the frame 350 of the vehicle 100 through the third housing 174.

Differing from the arrangement of the upper air guide 114 and the air guide assembly 130 depicted in FIGS. 2-4, FIGS. 5 and 6 depict an alternative embodiment where an upper air guide 114' is in fluid communication with an air guide assembly 130' through a first passage 134' that is bifurcated across a center of the vehicle 100 in the lateral direction of the vehicle 100. According to this aspect, the first passage 134' is defined by a first branch 136' positioned in a left side of the vehicle 100 and a second branch 138' (see FIG. 1, in hidden lines) positioned in a right side of the vehicle 100 with respect to the left-right direction of the vehicle 100.

Figure 5:
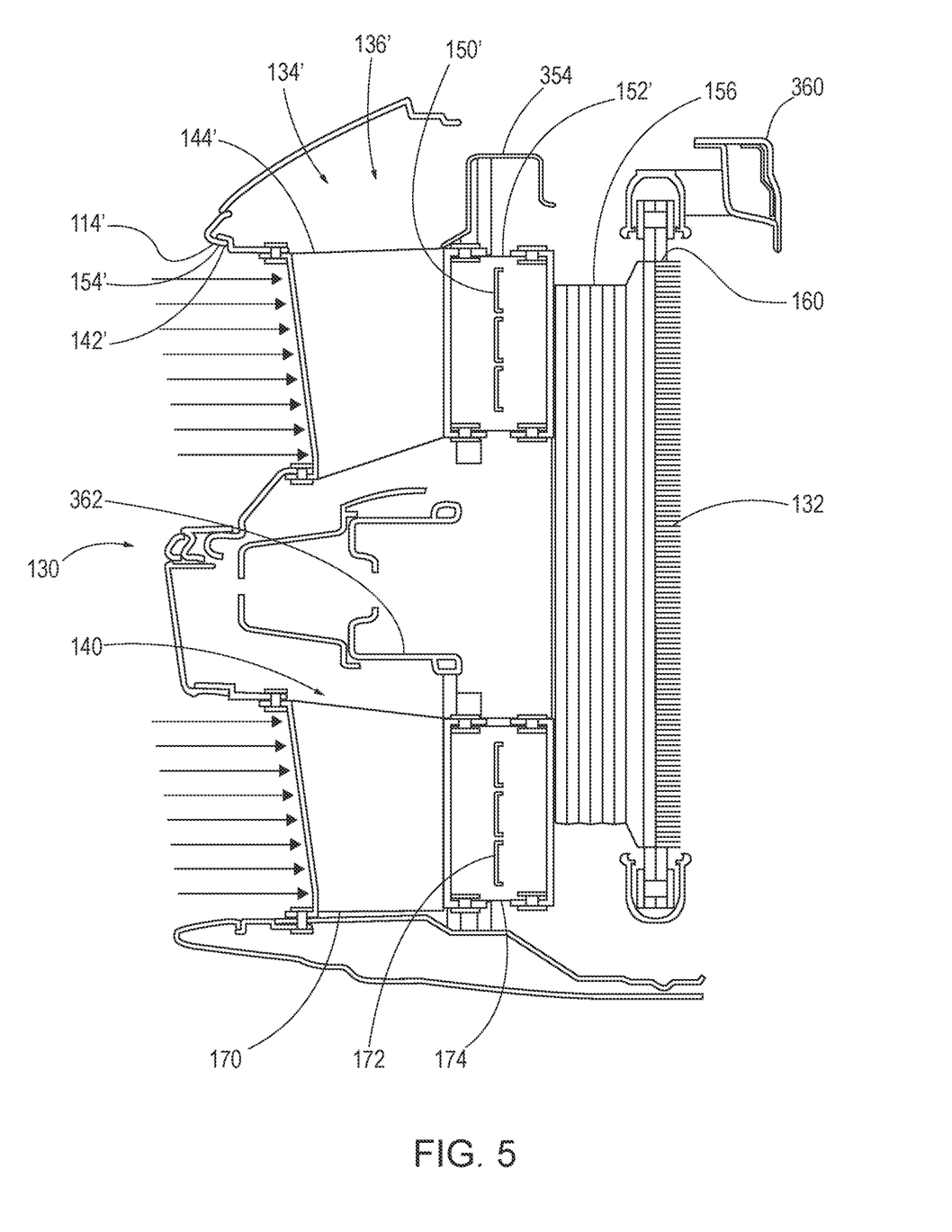
FIG. 5 is a partial cross-sectional side view of the vehicle including an air guide assembly according to another aspect of the present disclosure.

The first branch 136' of the first air passage 134' features a construction similar to the second branch 138' and unless otherwise stated, the following description made with reference to the first branch 136' is similarly applicable to the second branch 138'. FIG. 5 depicts a cross-sectional view of the air guide assembly 130' along the first branch 136' of the first air passage 134', taken from a plane illustrated in FIG. 1 in the longitudinal direction of the vehicle 100 and a vertical direction of the vehicle 100. As shown in FIG. 5, the first branch 136' includes a first conduit 142' secured to the vehicle body 102, a first duct 144', and a first shutter 150' positioned in a first housing 152' secured to the vehicle body 102, where the first conduit 142', the first duct 144', and the first housing 152' are in fluid communication with each other and between an outlet 154' of the upper air guide 114' and the second duct 156. In contrast to the air guide assembly 130 depicted in FIGS. 2-4, the air guide assembly 130' is depicted in FIGS. 5 and 6 as relatively extended in the longitudinal direction of the vehicle 100, where the first duct 144', the second duct 156, and the third duct 170 are elastically deformed into a relatively flat configuration to respectively accommodate the first housing 152', the second housing 160, and the third housing 174.

In an embodiment, the first housing 152' is in fluid communication with the second branch 138' such that airflow directed through the second branch 138' is further directed to the second duct 156 through the first housing 152'. In an alternative embodiment, the second branch 138' is in fluid communication with the second duct 156 through a housing (not shown) separate from the first housing 152' in the air guide assembly 130' such that airflow directed through the second branch 138' is further directed to the second duct 156 through the housing, independently of airflow through the first housing 152'.

The front end 106 of the vehicle 100 includes a center up beam 354, a front bulkhead 360, and a front bumper beam 362 extended in the lateral direction of the vehicle 100. The first conduit 142' is mounted on the front end 106 of the vehicle 100 with the upper air guide 114', the first housing 152' is mounted on the center up beam 354, the second housing 160 is mounted on the front bulkhead 360, the second conduit 164 is mounted on the front end 106 of the vehicle 100 with the lower air guide 122, and the third housing 174 is mounted on the front bumper beam 362 and the front end 106 of the vehicle 100. With this construction, the first conduit 142', the first duct 144', and the first housing 152' are isolated from vibration and deformation in the front end 106 of the vehicle 100 between the first housing 152' at the center upper beam 354 and the second housing 160 at the front bulkhead 360, and are isolated from vibration and deformation in the front end 106 of the vehicle 100 between the second conduit 164 and the third housing 174 at the front bumper beam 362. The second duct 156 and the second housing 160 are isolated from vibration and deformation in the front end 106 of the vehicle 100 between the first conduit 142' and the first housing 152' at the center upper beam 354, and are isolated from vibration and deformation in the front end 106 of the vehicle 100 between the second conduit 164 and the third housing 174 at the front bumper beam 362. The second conduit 164, the third duct 170, and the third housing 174 are isolated from vibration and deformation in the front end 106 of the vehicle 100 between the first housing 152' at the center upper beam 354 and the second housing 160 at the front bulkhead 360, and are isolated from vibration and deformation in the front end 106 of the vehicle 100 between the first conduit 142 and the first housing 152' at the front bumper beam 362. Unless otherwise stated, the upper air guide 114' and the air guide assembly 130' respectively have similar features and function in a similar manner as the upper air guide 114 and the air guide assembly 130.

Figure 6:
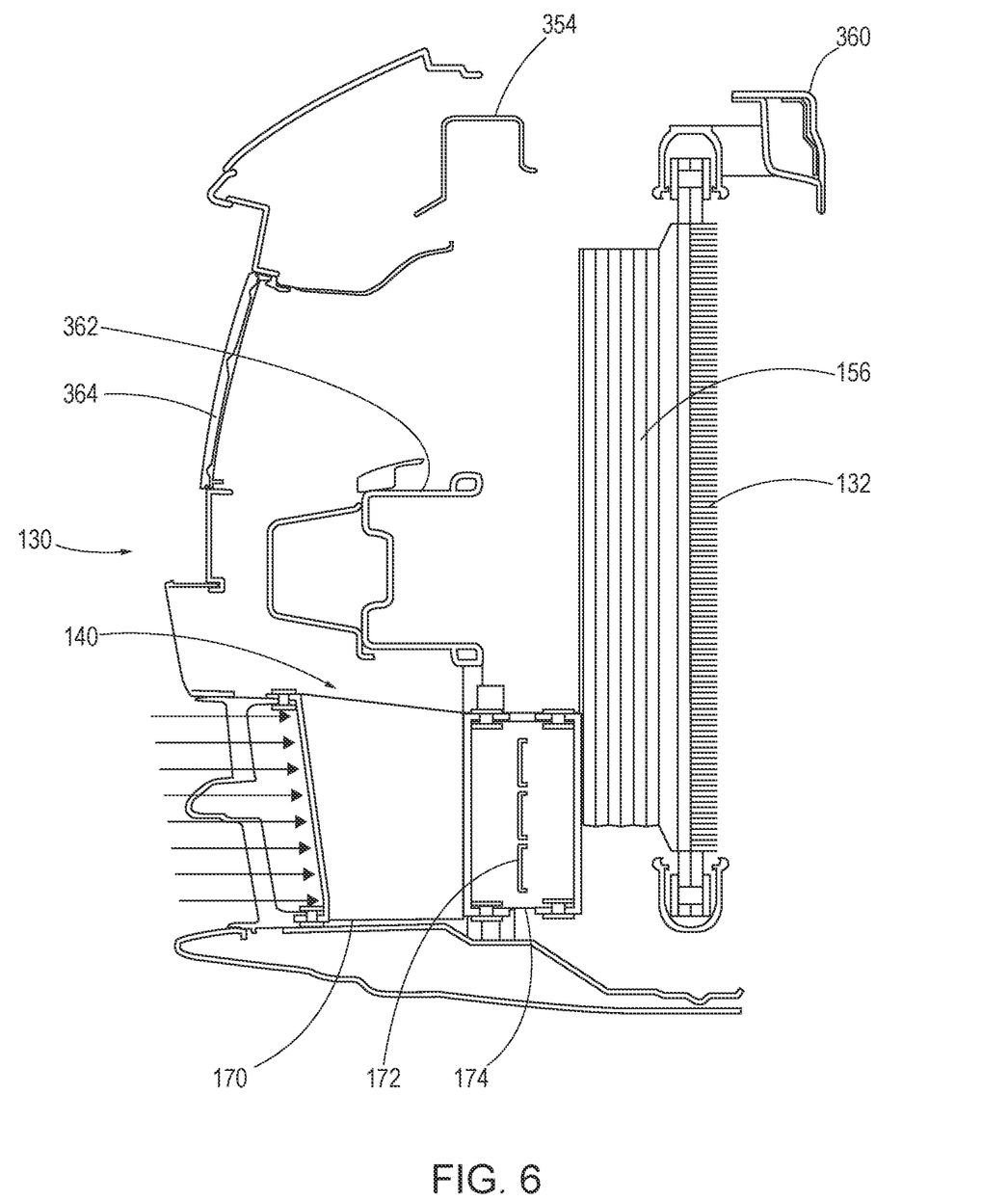
FIG. 6 is a partial cross-sectional side view of the vehicle including the air guide assembly of FIG. 5.

FIG. 6 depicts a cross-sectional view of the air guide assembly 130' along the center of the vehicle 100 in the lateral direction of the vehicle 100, taken from a plane illustrated in FIG. 1 in the longitudinal direction of the vehicle 100 and the vertical direction of the vehicle 100. Because the first passage 134' is bifurcated across a center of the vehicle 100 in the lateral direction of the vehicle 100, the upper air guide 114' and the first passage 134' do not occupy a space at the center of the vehicle 100 in the lateral direction of the vehicle 100. As shown in FIG. 1, the front end 106 of the vehicle 100 includes an emblem 364 drawn in hidden lines and disposed on the exterior surface 112 of the vehicle 100 at the center of the vehicle 100 in the lateral direction of the vehicle 100. The emblem 364 is interposed between and separates portions of the upper air guide 114' along the lateral direction of the vehicle 100. With this, the emblem 364 is located between the first branch 136' and the second branch 138' of the first air passage 134' in the lateral direction of the vehicle 100 such that, as shown in FIG. 6, the first air passage 134' is not located behind the emblem 364 in a front-back direction of the vehicle 100.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An air guide assembly for a vehicle, the air guide assembly comprising:
   a first duct including a flexible body, an inlet for receiving airflow from an exterior of a vehicle body, and an outlet, wherein the body of the first duct is compressible from an installed length to a length that is shorter than the installed length, and the body of the first duct is expandable from the installed length to a length that is longer than the installed length;
   a second duct including a flexible body, a first inlet for receiving airflow from the first duct, and an outlet, wherein the body of the second duct is compressible from an installed length to a length that is shorter than the installed length, and the body of the second duct is expandable from the installed length to a length that is longer than the installed length;
   a rigid first housing secured to the vehicle body, the first housing including an inlet removably secured to the outlet of the first duct and an outlet removably secured to the first inlet of the second duct; and
   a vehicle component in fluid communication with the outlet of the first housing.

2. The air guide assembly of claim 1, further comprising:
   a rigid second housing secured to the vehicle body, the second housing including an inlet removably secured to the outlet of the second duct, wherein the vehicle component is positioned in the second housing.

3. The air guide assembly of claim 2, wherein the vehicle component is a flow through heat exchanger.

4. The air guide assembly of claim 2, wherein the second duct is airtight from the first housing to the second housing such that airflow directed into the first inlet of the second duct is further directed through the outlet of the second duct.

5. The air guide assembly of claim 2, wherein the outlet of the second duct forms an airtight seal with the inlet of the second housing such that airflow directed through the outlet of the second duct is further directed into the inlet of the second housing.

6. The air guide assembly of claim 2, further comprising:
a third duct including a flexible body, an inlet for receiving airflow from the exterior of the vehicle body, and an outlet, wherein the body of the third duct is compressible from an installed length to a length that is shorter than the installed length, wherein the body of the third duct is expandable from the installed length to a length that is longer than the installed length, and wherein the second duct further comprises a second inlet for receiving airflow from the third duct.

7. The air guide assembly of claim 6, further comprising:
a rigid third housing secured to the vehicle body, the third housing including an inlet removably secured to the outlet of the third duct and an outlet removably secured to the second inlet of the second duct.

8. The air guide assembly of claim 7, further comprising:
a second shutter positioned in the third housing that is operable to control airflow to the vehicle component.

9. The air guide assembly according to claim 7, wherein the third duct has walls formed from a series of panels flexibly interlinked with each other and configured to elastically deform and absorb motion between the vehicle body and the third housing.

10. The air guide assembly of claim 6, further comprising a rigid first conduit secured to the vehicle body, the first conduit including an inlet directly connected to the vehicle body for receiving airflow from the exterior of the vehicle body, and an outlet, wherein the inlet of the first duct is directly connected to the outlet of the first conduit to receive airflow from the exterior of the vehicle body.

11. The air guide assembly of claim 10, further comprising a rigid second conduit secured to the vehicle body, the second conduit including an inlet directly connected to the vehicle body for receiving airflow from the exterior of the vehicle body, and an outlet, wherein the inlet of the third duct is directly connected to the outlet of the second conduit to receive airflow from the exterior of the vehicle body,
wherein the first conduit is located at a front end of the vehicle to direct a headwind of the vehicle inside the vehicle body, and the second conduit is located at the front end of the vehicle below the first conduit in an up-down direction of the vehicle to direct the headwind of the vehicle inside the vehicle body.

12. The air guide assembly of claim 10, further comprising a rigid third housing secured to the vehicle body, the third housing including an inlet removably secured to the outlet of the third duct and an outlet removably secured to the second inlet of the second duct,
wherein the outlet of the second conduit forms an airtight seal with the inlet of the third duct such that airflow through the outlet of the second conduit is further directed into the inlet of the third duct, and the third duct is airtight from the second conduit to the third housing such that airflow directed into the inlet of the third duct is further directed through the outlet of the third duct and into the third housing.

13. The air guide assembly of claim 1, wherein the first duct has walls formed from a series of panels flexibly interlinked with each other and configured to elastically deform and absorb motion between the first housing and a second rigid housing secured to the vehicle body, and wherein the second duct has walls formed from a series of panels flexibly interlinked with each other and configured to elastically deform and absorb motion between the first housing and the second housing.

14. The air guide assembly of claim 1, further comprising a rigid first conduit secured to the vehicle body, the first conduit including an inlet directly connected to the vehicle body for receiving airflow from the exterior of the vehicle body, and an outlet, wherein the inlet of the first duct is directly connected to the outlet of the first conduit to receive airflow from the exterior of the vehicle body.

15. An air guide assembly for a vehicle, the air guide assembly comprising:
a rigid first conduit secured to a vehicle body, the first conduit including an inlet directly connected to the vehicle body for receiving airflow from the exterior of the vehicle body, and an outlet;
a first duct including a flexible body, an inlet for receiving airflow from the exterior of the vehicle body, and an outlet, wherein the body of the first duct is compressible from an installed length to a length that is shorter than the installed length, and the body of the first duct is expandable from the installed length to a length longer than the installed length, the first duct having walls formed from a series of panels flexibly interlinked with each other and configured to elastically deform and absorb motion between the inlet of the first duct and the outlet the first duct, the inlet of the first duct being connected to the outlet of the first conduit to receive airflow from the exterior of the vehicle body;
a second duct including a flexible body, a first inlet for receiving airflow from the first duct, and an outlet, wherein the body of the second duct is compressible from an installed length to a length that is shorter than the installed length, and the body of the second duct is expandable from the installed length to a length longer than the installed length;
a rigid first housing secured to the vehicle body, the first housing including an inlet removably secured to the outlet of the first duct and an outlet removably secured to the first inlet of the second duct;
a rigid second housing secured to the vehicle body, the second housing including an inlet removably secured to the outlet of the second duct; and
a vehicle component in fluid communication with the outlet of the first housing.

16. The air guide assembly of claim 15, further comprising:
a first shutter positioned in the first housing that is operable to control airflow to the vehicle component.

17. The air guide assembly of claim 15, wherein the first inlet of the second duct forms an airtight seal with the outlet of the first housing such that airflow directed through the outlet of the first housing is further directed into the first inlet of the second duct.

18. The air guide assembly of claim 15, wherein the outlet of the first duct overlaps the inlet of the first housing around an outer perimeter of the first housing to form an airtight seal between the first duct and the first housing, and a fastener is extended through the first duct and the first housing where the first duct overlaps the first housing.

19. The air guide assembly of claim 15, wherein the outlet of the first conduit forms an airtight seal with the inlet of the first duct such that airflow directed through the outlet of the first conduit is further directed into the inlet of the first duct, and the first duct is airtight from the first conduit to the first housing such that airflow directed into the inlet of the first duct is further directed through the outlet of the first duct.

20. The air guide assembly of claim 15, wherein the outlet of the first duct forms an airtight seal with the inlet of the first housing such that airflow directed through the downstream end of the first duct is further directed into the inlet of the first housing.

\* \* \* \* \*